(12) United States Patent
Anisimovich et al.

(10) Patent No.: US 8,036,461 B2
(45) Date of Patent: Oct. 11, 2011

(54) METHOD OF GRAPHICAL OBJECTS RECOGNITION USING THE INTEGRITY PRINCIPLE

(75) Inventors: Konstantin Anisimovich, Moscow (RU); Alexander Shamis, Moscow (RU); Konstantin Zuev, Moscow (RU)

(73) Assignee: ABBYY Software Limited, Nicosia (CY)

( * ) Notice: Subject to any disclaimer, the term of this patent is extended or adjusted under 35 U.S.C. 154(b) by 1168 days.

(21) Appl. No.: 10/657,008

(22) Filed: Sep. 8, 2003

(65) Prior Publication Data

US 2004/0264774 A1 Dec. 30, 2004

(30) Foreign Application Priority Data

Jun. 24, 2003 (RU) .................. 2003118580

(51) Int. Cl.
*G06K 9/34* (2006.01)
*G06K 9/00* (2006.01)
*G06K 9/20* (2006.01)

(52) U.S. Cl. .................. 382/173; 382/181; 382/321

(58) Field of Classification Search .................. 382/171, 382/173–187, 305, 312, 321; 345/440, 619
See application file for complete search history.

(56) References Cited

U.S. PATENT DOCUMENTS

| | | | | |
|---|---|---|---|---|
| 5,321,768 | A * | 6/1994 | Fenrich et al. | 382/178 |
| 5,465,304 | A * | 11/1995 | Cullen et al. | 382/176 |
| 5,680,479 | A | 10/1997 | Wang et al. | 382/176 |
| 5,684,891 | A | 11/1997 | Tanaka et al. | 382/178 |
| 5,838,820 | A * | 11/1998 | Bergman | 382/187 |
| 6,038,342 | A * | 3/2000 | Bernzott et al. | 382/173 |
| 7,058,240 | B2 * | 6/2006 | Albertelli et al. | 382/305 |
| 7,283,669 | B2 * | 10/2007 | Andel et al. | 382/177 |

* cited by examiner

*Primary Examiner* — Kanjibhai Patel
(74) *Attorney, Agent, or Firm* — John C. Meline

(57) ABSTRACT

The present invention discloses a method to increase reliability, correctness of objects recognition processing by performing a recognized object description as a set of special standard elements along with the spatial and parametrical correlation thereof. The said standard elements are preliminarily assigned graphic structures of elementary form and of easy identification and recognition. They may be provided with spatial and/or parametric details and thus may describe any object on the image including characters of text.

16 Claims, 2 Drawing Sheets

METHOD OF GRAPHICAL OBJECTS RECOGNITION USING THE INTEGRITY PRINCIPLE

BACKGROUND OF THE INVENTION

1. Field of the Invention

The present invention relates generally to character recognition on a bit-mapped binary image or other binary or raster images and more particularly to recognition of non-text and/or text objects on the document image.

The abovementioned methods are also used in forms recognition. Said forms combine portions of typographical and hand-written text along with a set of special reference points meant for orientating on the document or form. Some examples of forms are questionnaires, bank invoices of fixed or non-fixed field layout.

Said methods can be also used for the recognition of objects of any pre-defined kind on a bit-mapped image.

2. Prior Art

Segmentation and parsing methods are known in the art.

Today there is a number of known methods of image recognition on a bit-mapped image by performing a comparison between an obtained image in the form of initial image units aggregate (commonly pixels) and a model image of the whole object or a set of possible object's embodiments stored in a special reference means usually termed classifier.

A known group of methods of text recognition comprises parsing the document into parts presumably containing images of letters with the further comparison of said images with those stored in one or more special feature and/or raster classifiers.

The said method is disclosed, for example, in U.S. Pat. No. 5,680,479 (Oct. 21, 1997, Wang, et al.).

A similar method is disclosed in U.S. Pat. No. 5,684,891 (Nov. 4, 1997, Tanaka, et al.). The document describes a method of image parsing that enables to pick out a separate character images, which in the author's opinion makes the process more reliable. The character image as an aggregate of pixels is then compared with the model from a classifier.

A shortcoming of the method is that it uses full-sized images and full-sized models for comparison, which inevitably reduces the productivity of the process.

Therefore, the target of the present invention is to increase the reliability of objects recognition, to increase the noise immunity.

SUMMARY OF THE INVENTION

A method of objects recognition is disclosed.

The present invention discloses a method of objects recognition by comparing the recognized object image with the model, described as a set of standard elements of a limited number of types along with spatially parametrical correlation thereof. Said standard elements are preliminarily assigned graphic structures of simple (elementary) geometrical form and of easy identification and recognition on the image. The said standard elements may be provided with spatial and/or parametric details (characteristics) and thus may describe any object including characters of text.

DETAILED DESCRIPTION OF THE INVENTION

A method of graphical objects recognition is disclosed.

The present invention discloses a method of increasing the reliability, correctness of objects recognition process by performing a recognized object description as a set of standard elements.

The said target of the invention is achieved by the preliminarily assignment of graphical structures of a simple (elementary) geometrical form as standard elements suitable to form the models of recognized objects. Said standard elements can be reliably identified due to the simple geometrical form thereof.

Each said standard element comprises more then one pixel (initial graphical unit).

Each recognized object is described as comprising one or more preliminarily assigned standard elements as parts along with the corresponding spatially parametric correlation thereof. The recognized object may comprise standard elements of one or more types. They can differ in relative spatial location (attitude, position), size and/or other parameters.

Recognized objects can be of various kinds: document design elements, special graphical elements, reference points or the like, meant for orientating on the document or form, text elements, characters of printed and/or hand-written type including.

The essence of the invention is as follows.

One or more types of graphical elements of simple form are preliminarily assigned as standard elements to compose the recognized objects. Some of the examples of standard elements are: straight-line segment, circle, oval, arc etc.

Said standard elements are remarkable for their high identification and recognition reliability in the image, due to their geometrical simplicity.

Said standard elements may differ in spatially—parametrical characteristics. For example, a straight-line segment may differ in length, incline angle, line thickness (absolute and/or relative) etc.; an arc may differ in angle, radius of curvature, orientation etc.

Said standard elements may comprise white portions—areas with white color, not black or other colored and even transparent.

Figures 1, 2:
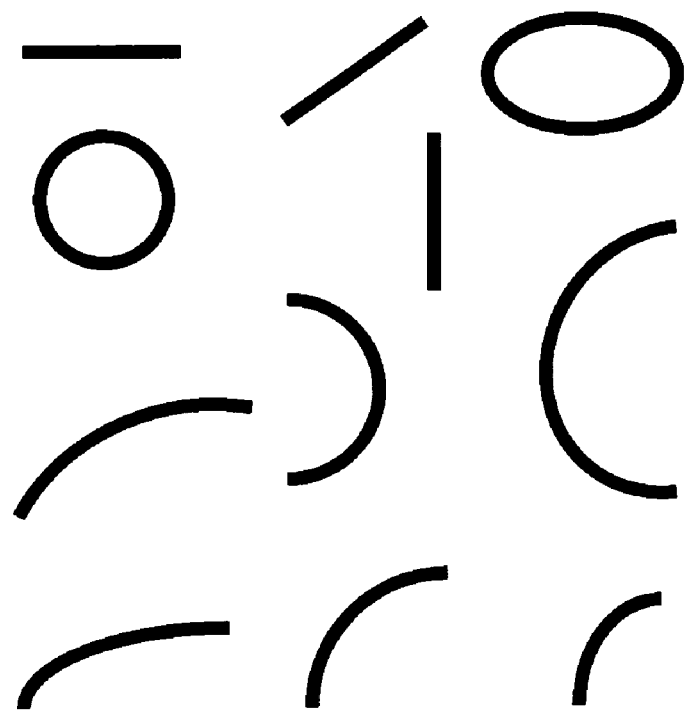
FIG. 1. shows examples of prime standard elements.
FIG. 2. shows some possible variants of a recognized object's image appearance as sets of standard elements by the example of character "B".

FIG. 1 shows the examples of basic standard elements.

The classifier (reference means) to be used for objects recognition (characters, reference points, other kinds of graphical elements) is filled with object's descriptions in a form of sets of composing standard elements, along with positional relationship and spatially parametrical correlation thereof.

The said classifier is also filled with possible deviations of recognized object's image as additional sets of standard elements composing the said object along with positional relationship and relative and/or absolute dimensions thereof. The said descriptions may differ greatly either by the set of standard elements or by their spatially parametrical correlation. Some possible variants of a recognized object's appearance via standard elements sets by the example of character "B" are shown on the FIG. 2.

Then the image is processed to identify and recognize standard elements.

Groups of standard elements presumably composing an object are selected. For each said group the hypothesis is set up and tested about the belonging of all set of elements as a whole to a supposed object described in the classifier.

In the case of not enough reliable result of the said hypothesis test a new hypothesis is set up and tested about the belonging of all set of elements as a whole to another supposed object described in the classifier.

After all possible hypotheses testing the most reliable variant of the object is selected. In the case of ambiguous result of hypotheses testing supplementary information or supplementary recognition methods can be used.

Said standard elements may compose more complicated standard elements by joining up into various combinations of elements of similar or various types with different positional relationship and size thereof. For example, a composition of horizontal and vertical straight-line segments forms complicated standard element cross.

Figure 3:
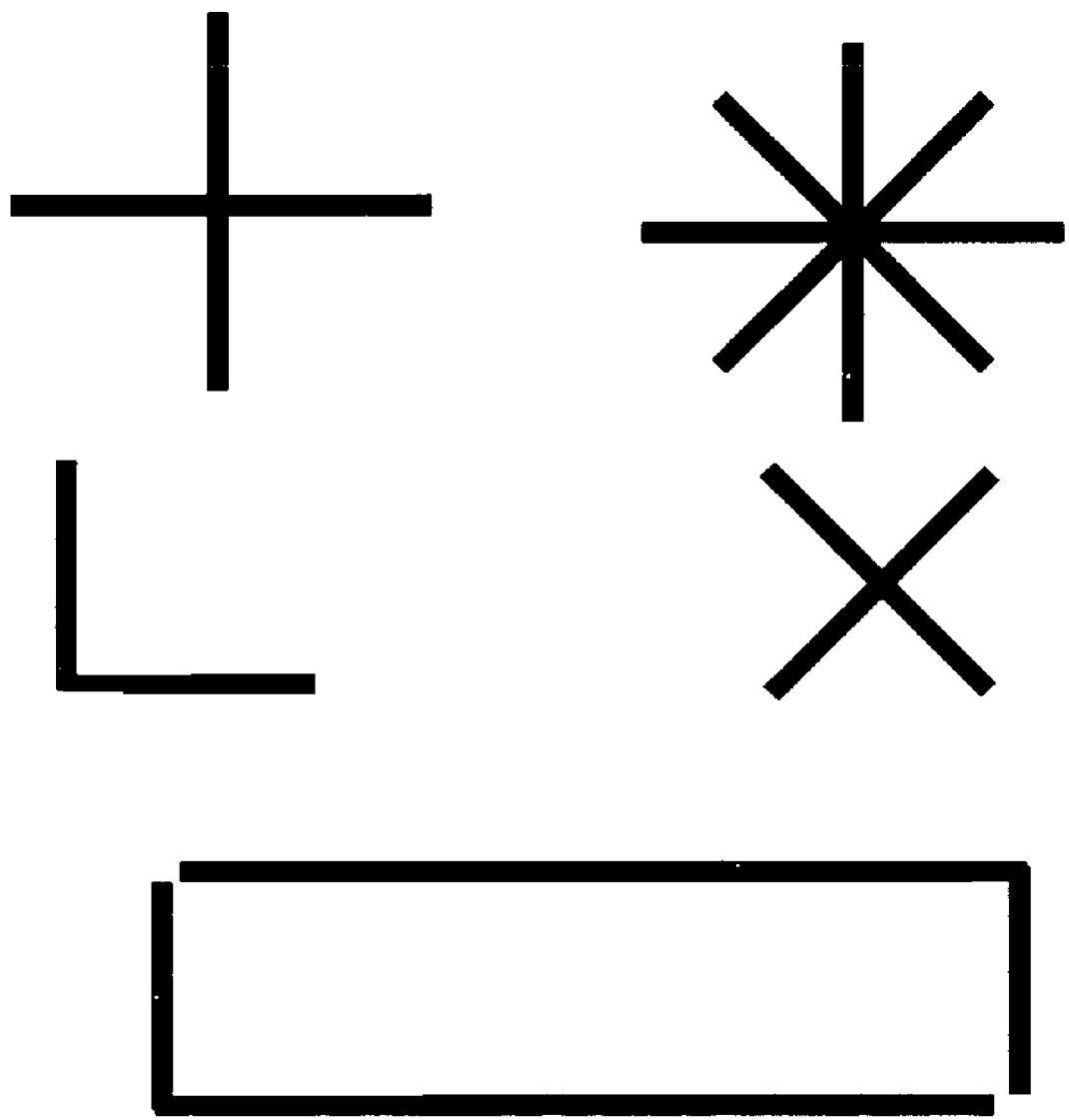
FIG. 3. shows some examples of complicated standard elements.

Some examples of complicated standard elements are shown on the FIG. 3.

The set of the standard elements composing recognized object may be described in a form of alternative. For example, the recognized object presumably consists of Standard-element-1 .and. Standard-element-3 .and. (Standard-element-7 .or. Standard-element-10 .or. Standard-element-11) .and. Standard-element-5. Here one of the elements of the recognized object is described in the form of alternative—(Standard-element-7 .or. Standard-element-10 .or. Standard-element-11).

A spatially parametrical correlation of standard elements may be described as an alternative. For example, the Standard-element-2 is situated 1.5 mm upper-left from Standard-element-3 .or. 2.1 mm right from Standard-element-11.

Standard elements may partly contain portions of white color, no color or even be transparent.

The recognized object description may be realized in the form of interval for one or more spatially parametrical correlation values.

The recognized object description may be also realized as a set of standard elements connected by relations of mathematical logic, of "AND" type, of "OR" type, of "NOT" type including.

The standard elements correlation in a recognized object may be expressed in the form of more then a single-level structure.

We claim:

1. A method of object recognition using a classifier on a bit-mapped image, comprising:
   identifying objects to be recognized on the bit-mapped image;
   preliminarily assigning at least one graphical structure comprising more than one primary graphical unit to be used as a standard element constituent of each object to be recognized;
   preliminarily describing each object to be recognized as a set of said standard elements of at least one type along with spatially parametrical correlations thereof;
   performing the following steps:
      search and identification of at least one standard element on the said-bit-mapped image;
      selection of at least one standard element image for testing on as belonging to the object to be recognized; and
      setting up and testing a hypothesis about the object to be recognized on the basis of an image formed by aggregating all each selected standard element image taking into account spatially parametrical correlations thereof.

2. The method as recited in claim 1, wherein at least one standard element composing the recognized object is specified with alternative variants.

3. The method as recited in claim 1, wherein the set of standard elements composing the recognized object is specified with alternative variants.

4. The method as recited in claim 1, wherein at least one standard element composing the recognized object comprises an interval for at least one spatially parametrical correlation value.

5. The method as recited in claim 1, wherein the image at least partly contains standard elements connected by relations of mathematical logic.

6. The method as recited in claim 1, wherein aggregating each selected standard element image additionally comprises analysis of standard elements connected by a relation of "AND" type, analysis of standard elements connected by a relation of "OR" type, and analysis of standard elements connected by a relation of "NOT" type.

7. The method as recited in claim 1, wherein said standard element correlations in the recognized object are expressed in the form of more than single-level structure.

8. The method as recited in claim 1, wherein said standard elements at least partly contain portions of white color.

9. The method as recited in claim 1, wherein said standard elements at least partly contain transparent portions.

10. The method as recited in claim 1, wherein in the case of an ambiguous result of hypotheses testing setting up and testing a supplementary information.

11. The method as recited in claim 1, wherein in the case of an ambiguous result of hypotheses testing setting up and testing supplementary recognition methods.

12. The method as recited in claim 1, wherein the said standard element is composed of more prime standard elements of at least one type.

13. The method as recited in claim 1, wherein the description of an object to be recognized is specified as a set of standard elements and spatially parametrical correlation thereof and is placed into a special means for storage and search.

14. The method of claim 1, wherein the object to be recognized is a graphical object.

15. The method of claim 1, wherein the object to be recognized is a character.

16. The method of claim 1, wherein said selection is of a group of standard elements.

* * * * *